US008712243B2

(12) United States Patent
Chow et al.

(10) Patent No.: US 8,712,243 B2
(45) Date of Patent: Apr. 29, 2014

(54) METHODS AND APPARATUS FOR ACHIEVING MULTIPLE BIT RATES IN PASSIVE OPTICAL NETWORKS

(75) Inventors: Hungkei Keith Chow, Scotch Plains, NJ (US); Manyalibo Joseph Matthews, Jersey City, NJ (US); Dusan Suvakovic, Marina Del Rey, CA (US); Doutje T. Van Veen, Berkeley Heights, NJ (US)

(73) Assignee: Alcatel Lucent, Paris (FR)

( * ) Notice: Subject to any disclaimer, the term of this patent is extended or adjusted under 35 U.S.C. 154(b) by 1235 days.

(21) Appl. No.: 11/015,152

(22) Filed: Dec. 17, 2004

(65) Prior Publication Data
US 2006/0133809 A1    Jun. 22, 2006

(51) Int. Cl.
*H04J 14/08*       (2006.01)
*H04B 10/00*      (2013.01)

(52) U.S. Cl.
USPC .................................. 398/99; 398/67; 398/155

(58) Field of Classification Search
USPC ............. 398/41, 60, 63, 67, 98, 99, 100, 135, 398/138, 153, 154, 155, 66
See application file for complete search history.

(56) References Cited

U.S. PATENT DOCUMENTS

| 5,867,543 | A * | 2/1999 | Roberts et al. | 375/365 |
|---|---|---|---|---|
| 6,760,391 | B1 * | 7/2004 | Alb et al. | 375/354 |
| 6,778,599 | B1 * | 8/2004 | Doron | 375/232 |
| 6,832,046 | B1 * | 12/2004 | Thomas | 398/72 |
| 7,076,177 | B1 * | 7/2006 | Yang et al. | 398/208 |
| 2003/0147654 | A1 * | 8/2003 | Sung et al. | 398/168 |
| 2004/0184810 | A1 | 9/2004 | Spilman et al. | |
| 2005/0265377 | A1 * | 12/2005 | Mizuno et al. | 370/463 |
| 2006/0079272 | A1 * | 4/2006 | Yan | 455/552.1 |

FOREIGN PATENT DOCUMENTS

JP           08008954 A    *  1/1996    ............ H04L 12/44
WO    WO 2005099298 A1  * 10/2005

OTHER PUBLICATIONS

Shoukei Kobayashi, Youichi Fukada, Masashi Hashimoto, "Multi-Bit Rate Passive Double Star System Using Time-Unit Packet," Feb. 2001, Journal of Lightwave Technology, vol. 19, No. 2, pp. 150-158.*

* cited by examiner

*Primary Examiner* — Daniel Dobson
(74) *Attorney, Agent, or Firm* — The Law Offices of Peter H. Priest (57) ABSTRACT

Systems and techniques for multiple bit rate optical data transmission. A passive optical network includes an optical line termination unit (OLT) connected to one or more optical network units (ONUs) by optical elements. The OLT is capable of performing downstream transmission to the ONUs at each of a variety of different bit rates, and each ONU performs upstream transmission at one or more bit rates. The OLT can sense a bit rate of a received transmission and change its operation so as to receive and process the transmission exhibiting the sensed bit rate. Each of the ONUs receives and processes downstream transmissions at one or more bit rates, but each ONU is capable of maintaining a phase and frequency lock to downstream transmissions at all bit rates supported by the OLT. One or more of the ONUs may also receive and process downstream transmissions exhibiting different or changed bit rates.

7 Claims, 11 Drawing Sheets

METHODS AND APPARATUS FOR ACHIEVING MULTIPLE BIT RATES IN PASSIVE OPTICAL NETWORKS

FIELD OF THE INVENTION

The present invention relates generally to improved systems and techniques for implementation and operation of data transmission networks. More particularly, the invention relates to systems and techniques for implementing passive optical networks capable of operating at varying bit transmission rates.

BACKGROUND OF THE INVENTION

As data communication services continue to develop and their uses continue to expand, the demand for higher transmission rates becomes greater. Similarly, the ability to satisfy this demand becomes more important.

One particularly promising technique for providing high speed data connections between a terminal and the subscribers served by that terminal is a passive optical network (PON). PON service can provide extremely high speeds compared to services provided using standard coaxial cable and digital subscriber lines (DSL), and can be installed at a cost substantially below that of conventional optical networks. A passive optical network delivers data to users through a connection between an optical line termination unit (OLT), which may suitably form a data communication terminal at which data is transmitted and received by a data provider, and a plurality of optical network units (ONUs). An ONU may be installed at a subscriber's home or business and may serve as the communication terminal whereby the subscriber receives data from and transmits data to the data provider. The connections between the OLT and the ONUs do not include any active electronics, but simply provide optical pathways between the OLT and the ONUs served by the OLT. Therefore, the connections between the OLT and the ONUs can be deployed relatively inexpensively.

Typical prior art passive optical networks support a fixed bit rate between each OLT and a group of ONUs connected to the OLT, typically predetermined by deploying an OLT and ONUs having desired characteristics, including the desired fixed bit rate operation. Each OLT and ONU includes a clock and data recovery circuit (CDR) that receives and interprets data signals received over the passive optical network. Each CDR receiving a signal locks to the bit rate of the received signal when the received signal exhibits the expected bit rate. However, the CDR falls out of lock when the signal does not exhibit the expected bit rate. The rate at which the OLT transmits to one or more ONUs is referred to as the "downstream" bit rate and the rate at which an ONU transmits to the OLT is referred to as the "upstream" bit rate. Prior art passive optical networks require that an OLT transmit at a single downstream bit rate to a group of ONUs to which it is connected and that the ONUs all share a common upstream bit rate.

Prior art passive optical network systems do not allow transmission at different bit rates between an OLT and a plurality of ONUs to which the OLT is connected. Therefore, these systems require a set of unique ONUs and OLTs for each bit rate that is to be supported, and connections between the OLTs and the ONUs for each bit rate. This limitation requires considerable duplication of infrastructure, because an OLT and accompanying cabling must be provided for each downstream bit rate that is to be supported. A group of customers desiring service at different bit rates cannot be served by the same OLT, even if the number of customers is within the capacity of the OLT and the customers are all located within range of the OLT. In addition, the need to transmit and receive at a single fixed bit rate reduces the flexibility of a data service, because it is difficult or impossible to change bit rates to adapt to changing needs or conditions, such as changes in bit rates required by particular customer applications or changes in bit rates supported by prevailing conditions affecting an optical path, for example.

There exists, therefore, a need for a passive optical network that provides for transmission at different bit rates between an OLT and a plurality of ONUs to which the OLT may be connected.

SUMMARY OF THE INVENTION

In one exemplary embodiment, a passive optical network according to an aspect of the present invention includes an optical line termination unit (OLT) connected to one or more optical network units (ONUs) by a network of optical elements.

The OLT is capable of performing downstream transmission at a plurality of bit rates, and each of the ONUs is capable of performing upstream transmission at one or more bit rates and of receiving and processing data transmitted at one or more bit rates and maintaining a phase and frequency lock to downstream transmissions at any bit rate. The OLT is capable of receiving and processing upstream transmissions at any bit rate supported by any ONU. Each of the ONUs receives and processes downstream transmissions at one or more bit rates, but is capable of maintaining a phase and frequency lock to downstream transmissions performed at any bit rate. An ONU that receives and processes data at only one bit rate will ignore data transmitted at a different bit rate, but will maintain a phase and frequency lock to the transmission, thus allowing for proper operation of all ONUs during all transmissions performed by the OLT. In addition, one or more ONUs may be designed so as to receive and process data at different bit rates.

A more complete understanding of the present invention, as well as further features and advantages, will be apparent from the following Detailed Description and the accompanying drawings.

DETAILED DESCRIPTION

The present invention will be described more fully hereinafter with reference to the accompanying drawings, in which several exemplary embodiments of the invention are shown. This invention may, however, be embodied in various forms and should not be construed as limited to the embodiments set forth herein.

Figure 1:
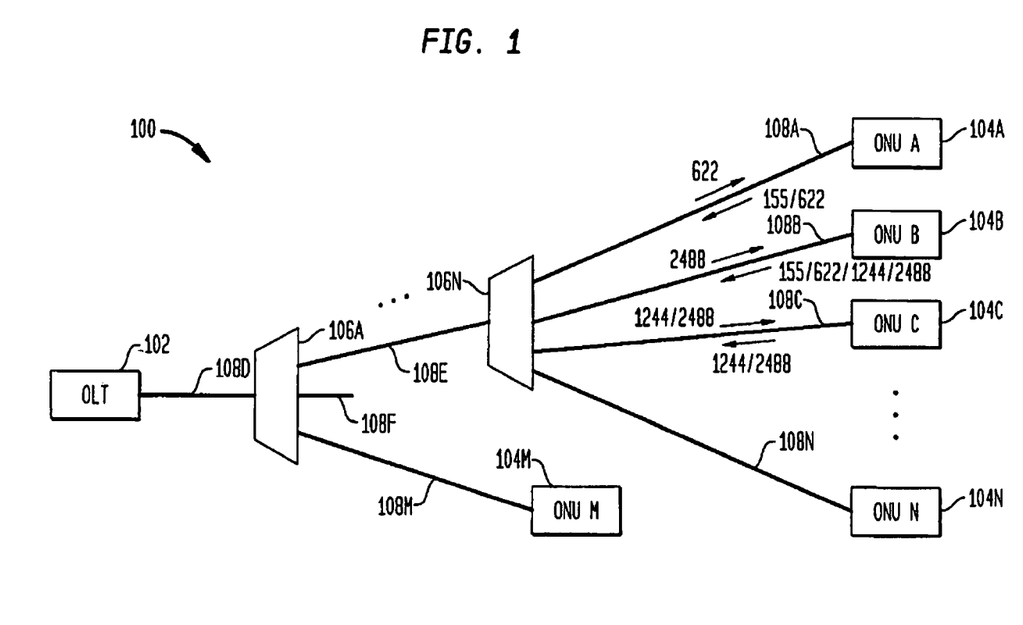
FIG. 1 illustrates a passive optical network according to an aspect of the present invention.

FIG. 1 illustrates a multiple bit rate passive optical network 100 according to an aspect of the present invention, including an optical line termination unit (OLT) 102, connected to a plurality of optical network units (ONUs) 104A ... 104N. The optical line termination unit 102 is connected to the optical network units 104A ... 104N by optical elements. The optical elements comprise a plurality of power splitter/combiners 106A ... 106N, with a plurality of optical connectors 108A ... 108N providing optical data connections between the OLT 102, the power splitter/combiners 106A ... 106N and the ONUs 104A ... 104N, with the power splitter/combiners 106A ... 106N used to multiply connections in order to support the number of ONUs required for a particular application. The optical connectors 108A ... 108N may suitably be single mode fibers.

The OLT 102 and the ONUs 104A ... 104N all engage in optical transmission and receiving of data. Transmission from the OLT 102 to the ONUs is referred to as "downstream" transmission, while the transmission from each of the ONUs 104A ... 104N to the OLT 102 is referred to as "upstream" transmission. Two separate wavelengths are used for downstream and upstream transmissions, allowing for upstream and downstream transmission and receiving to take place concurrently. The OLT 102, which can be considered to be the master unit in the network 100, is the only unit to transmit downstream and is the sole user of the downstream wavelength. By contrast, all ONUs 104A ... 104N share the upstream wavelength, by transmitting one at a time. Collision between signals transmitted simultaneously by different ones of the ONUs 104A ... 104N is avoided through scheduling of the transmission times of the ONUs. This scheduling is performed by the OLT 102. The OLT 102 is the only receiver of the upstream data traffic. The downstream data traffic transmitted by the OLT 102 is directed to all of the ONUs 104A ... 104N, although, as will be discussed further below, only those ONUs set to receive traffic at the bit rate of a particular transmission will receive and process that transmission. By way of example, the network 100 is a dual standard broadband passive optical network (BPON) and gigabit passive optical network (GPON). The OLT 102 is capable of downstream transmission at any bit rate supported by either the BPON or the GPON standard and each of the ONUs 104A ... 104N is capable of operating properly when exposed to any downstream transmission bit rate allowed in either the BPON or the GPON standard. Each of the ONUs 104A ... 104N receives and processes data meeting the criteria specified by one standard or the other, or both, and performs upstream transmission as specified by one standard or the other, or both. For example, the ONU 104A receives and processes downstream transmissions, and performs upstream transmissions, at bit rates specified by the BPON standard and the ONU 104B receives and processes downstream transmissions, and performs upstream transmissions, at bit rates specified by the GPON standard. The ONU 104C receives and processes downstream transmissions, and performs upstream transmissions, at bit rates specified by the GPON standard. Each of the ONUs 104A and 104B processes and receives data at only one rate, but each of the ONUs 104A and 104B is capable of maintaining proper operation during any downstream transmission produced by the OLT 102. The ONU 104C is capable of switching receiving speed so as to receive at each of the downstream bit rates specified by the GPON standard, but is capable of maintaining proper operation during any downstream transmission of the OLT 102.

A number of different standards for passive optical networks have been published, specifying protocols for transmission and bit rates employed. Currently published passive optical network standards include Asynchronous transfer mode (ATM) based passive optical networking (APON), described in ITU 983.1. The APON standard uses the ATM protocol and supports an upstream bit rate of 155 megabits per second (Mbps) and a downstream rate of 155 Mbps or 622 Mbps. Broadband passive optical networking (BPON) is described in ITU 983.3. The BPON standard uses the ATM protocol and supports an upstream bit rate of 155 megabits per second (Mbps) and a downstream rate of 155 Mbps or 622 Mbps. These bit rates are the same as those supported by the APON standard, but the BPON standard also provides enhanced wavelength bands for video and dense wavelength division multiplexing (DWDM). Gigabit passive optical networking (GPON) is described in ITU 984.1. The GPON standard supports the generic framing procedure (GFP) used in synchronous optical networks (SONET) and supporting upstream bit rates of 155 Mbps, 622, 1244 and 2488 Mbps and downstream bit rates of either 1244 or 2488 Mbps. Ethernet passive optical networking (EPON) is described in IEEE 802.3ah. The EPON standard employs a modified Ethernet protocol and supports upstream and downstream line rates of 1.25 Gbps.

The downstream transmission from the OLT 102 to the ONUs 104A ... 104N takes place at 155 Mbps, 622 Mbps, 1244 Mbps and 2488 Mbps. The ONU 104A receives and processes data transmitted at 622 Mbps and transmits data upstream at either of the bit rates 155 Mbps or 622 Mbps. The ONU 104B receives and processes data transmitted at 2488 Mbps and transmits data upstream at any of the bit rates 155 Mbps, 622 Mbps, 1244 or 2488 Mbps. The ONU 104C receives and processes data transmitted at 1244 Mbps and 2488 Mbps and transmits data upstream at either of the bit rates 1244 Mbps or 2488 Mbps. The performance of the rest of the ONUs 104D ... 104N is not discussed in detail here to avoid unnecessary duplication, but they all receive and process data, and transmit data upstream, at rates specified by the BPON or GPON standards, or both. Because of the flexibility of the present approach, it will be recognized that the present invention can be readily adapted to multiple bit rate systems of the future employing standards not presently developed.

The ONUs operating under the BPON standard receive data transmitted downstream at a rate of 155 Mbps or a rate of 622 Mbps and transmit data upstream at one or more of the bit rates 155 Mbps or 622 Mbps. The ONUs operating under the GPON standard receive data transmitted downstream at a rate of 1244 Mbps or a rate of 2488 Mbps and transmit data upstream at one or more of the bit rates 155 Mbps, 622 Mbps, 1244 Mbps or 2488 Mbps.

The OLT 102 and the ONUs 104A ... 104N are designed with components and features that allow for transmission at different bit rates and receiving and processing of data at different bit rates. In addition, each of the OLT 102 and the ONUs 104A ... 104N includes components and features that allow for proper operation during changes in received bit rates.

Figure 2A:
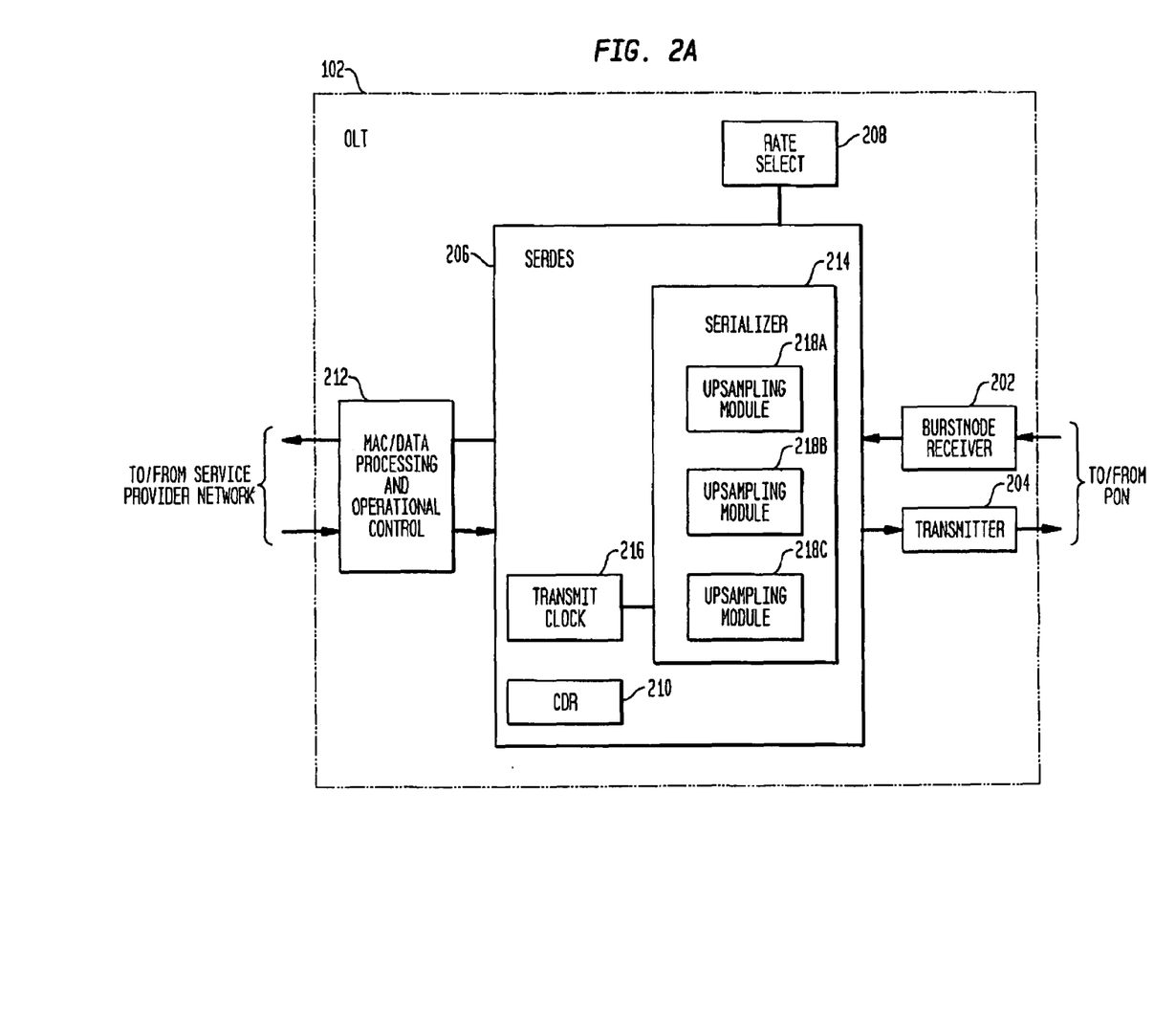
FIG. 2A illustrates an optical line termination unit according to an aspect of the present invention.

FIG. 2A illustrates additional details of the OLT 102. The OLT includes a burst mode receiver 202 and a transmitter 204. The OLT 102 also includes a serializer/deserializer (SERDES) 206, controlled by a rate select circuit 208. The SER- DES 206 detects the bit rate and other relevant characteristics of the incoming data stream, such as phase and frequency, and processes the incoming data stream in order to recover data. The SERDES 206 also constructs the outgoing data stream that is to be transmitted to the ONUs, providing the proper bit rate, phase and frequency for the data stream.

Figure 3A:
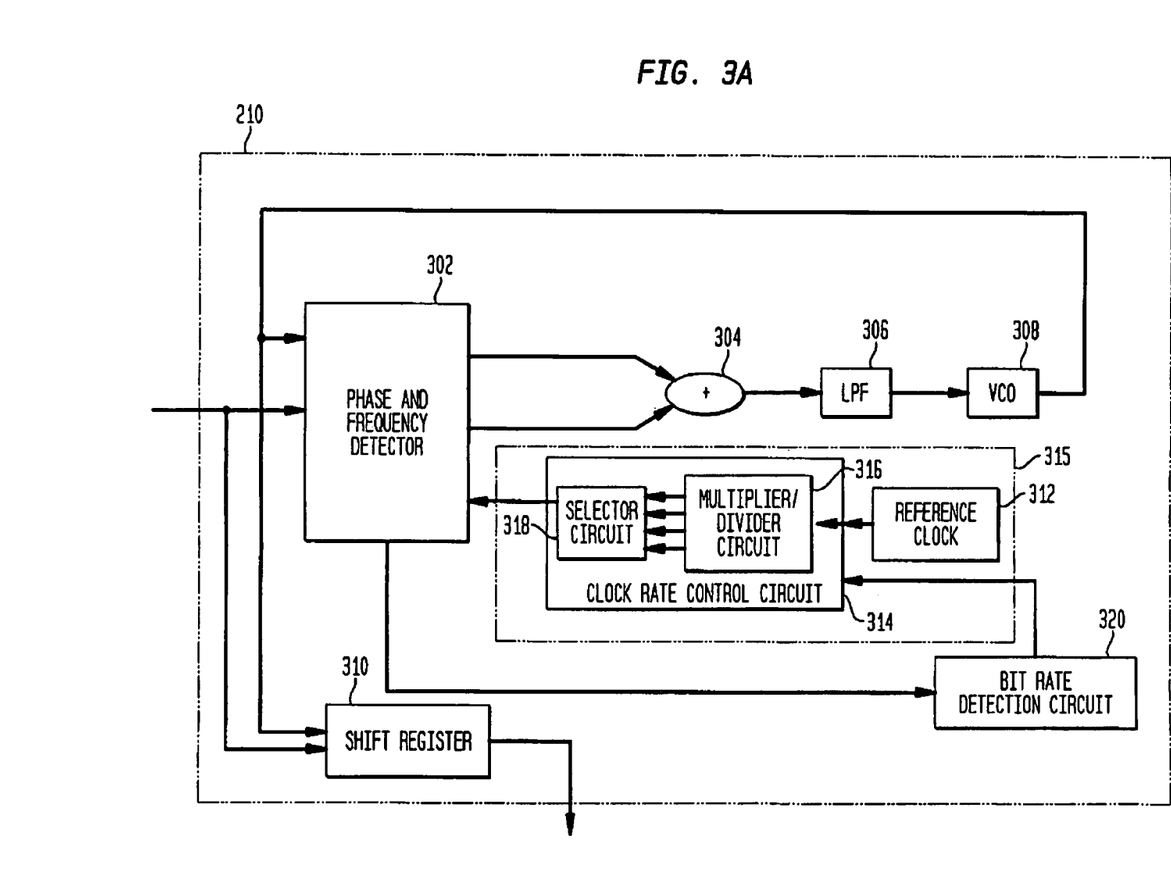
FIG. 3A illustrates a clock and data recovery circuit which may suitably be used in an optical line termination unit according to an aspect of the present invention.

The OLT 102 includes a clock and data recovery circuit (CDR) 210, which may be incorporated into the serializer/deserializer 206. The clock and data recovery circuit 210 is used to detect the bit rates of incoming signals and to synchronize the serializer/deserializer 206 to the detected bit rate of an incoming signal. The clock and data recovery circuit 210 is capable of detecting the bit rate of each transmission that may be received from one of the ONUs 104A ... 104N. The clock and data recovery circuit includes components for sensing the bit rate of the incoming signal and performing synchronization. These components are illustrated in FIG. 3A and discussed in further detail below.

The clock and data recovery circuit 210 is preferably capable of burst mode operation, because the OLT 102 is likely to receive incoming signals from the ONUs 104 ... 104N over short periods of time, requiring fast locking of data bursts arriving at the OLT 102. The OLT 102 must lock arriving data signals over a period much shorter than the period in which the "bursts" containing the data signals arrive at the OLT 102. Burst mode capability gives the OLT 102 the capability to process data from time division multiplexed bursts at different rates, and adapt to the possibility that large amounts of data will arrive within a short window of time.

The OLT 102 also includes a media access controller (MAC)/data processing and operation control circuit 212. The circuit 212 performs media access control, that is, it controls the times when the OLT 102 transmits and receives data. In addition, the MAC/data processing and operation control circuit 212 manages additional control and communication functions. For example, the circuit 212 extracts data from received signals and presents data to the SERDES 206 for transmission, manages scheduling for the network 100 and performs other control functions for the OLT 102 and the network 100. It will be recognized that the functions performed by the MAC/data processing and control circuit 212 are shown as being performed by a single entity, but numerous alternative implementations can be envisioned, such as controlling the timing of transmission and receiving by the OLT 102 using one circuit and performing other communication and control functions using a different circuit.

The SERDES 206 includes a serializer 214, used to construct the data stream for downstream transmission. The serializer 214 employs a transmit clock 216, used as a reference clock for establishing the proper characteristics of the data stream to be transmitted.

A number of the ONUs employed in the network 100, for example the ONUs 104A and 104B, receive and process data at only one rate, but are capable of maintaining proper operation, including maintaining a phase and frequency lock to the signal transmitted by the OLT 102, whether or not the signal is transmitted at the bit rate at which the ONU receives and processes data. A clock and data recovery circuit initially locked to a higher bit rate and then suddenly exposed to a lower bit rate will continue to maintain its lock so long as there is no abrupt phase shift at moments when transmission frequencies change, and will continue to maintain a lock during transmission at the lower bit rate so long as there is no excessively long period during which no bit transitions occur. Therefore, in order to provide assurance that each ONU will be able to maintain a proper frequency lock, the OLT 102 performs transmission at bit rates such that the highest bit rate used is an integer multiple of all other bit rates. Moreover, the clock 216 used to generate the data stream for transmission is operated at the highest speed for the network 100. Lower speed transmission is achieved by an upsampling module, to convert each data bit that is to be transmitted to a sequence of N identical bits, where N is the ratio between the highest data rate in the network 100 and the one to be used in the particular transmission. In order to achieve a choice between bit rates lower than the maximum bit rate, in this case the bit rates 155 Mbps, 622 Mbps and 1244 Mbps, the serializer 214 includes upsampling modules 218A, 218B and 218C, with the output of the appropriate upsampling module chosen depending on the bit rate required.

Figure 2B:
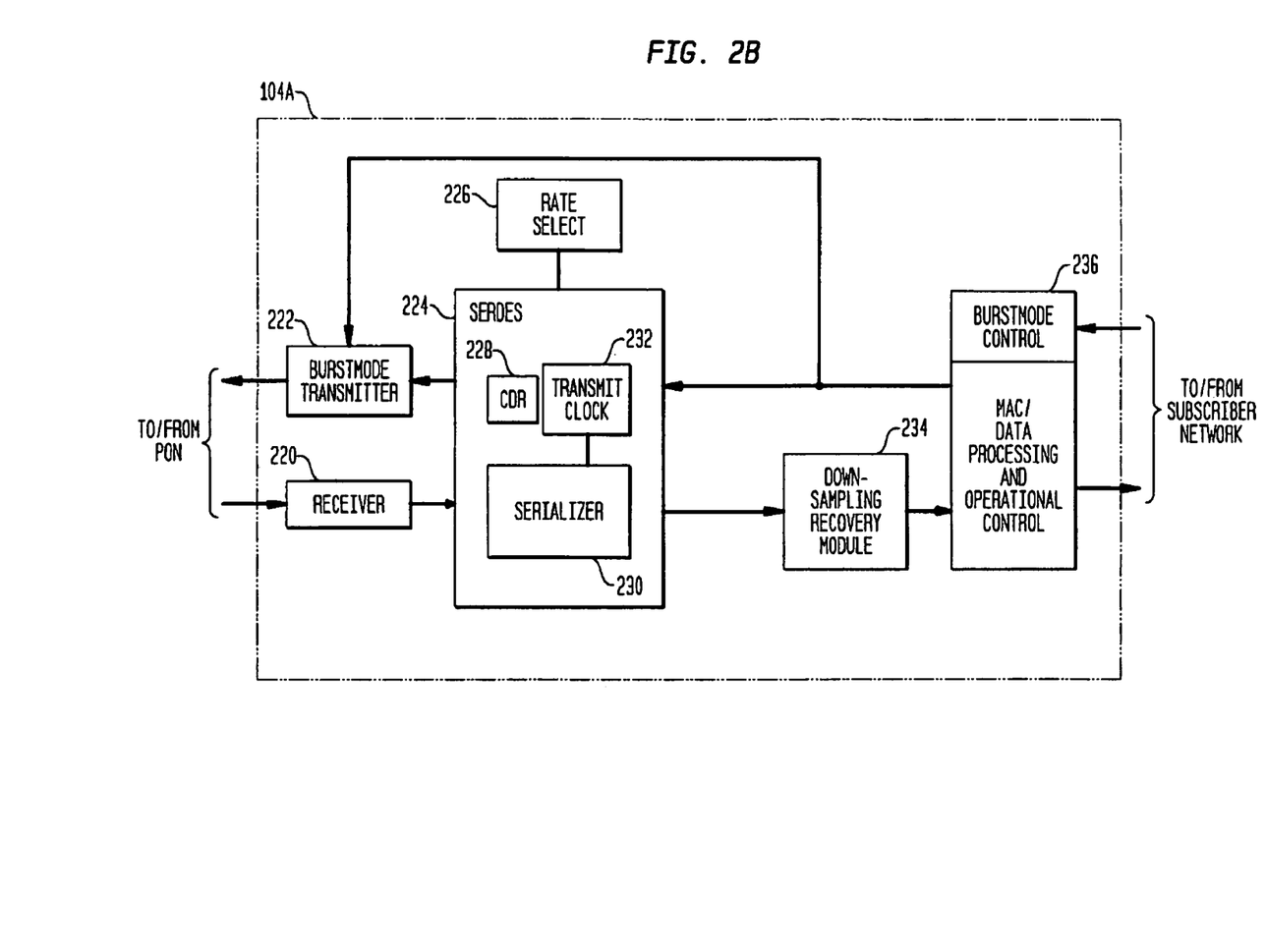
FIGS. 2B-2D illustrate optical network units according to an aspect of the present invention.

FIG. 2B illustrates additional details of the ONU 104A. The ONU 104A receives and processes data transmitted at 622 Mbps and ignores data transmitted at other bit rates. The ONU 104A includes a receiver 220 and a burst mode transmitter 222. The ONU 104A also includes a serializer/deserializer (SERDES) 224, controlled by a rate select circuit 226 and including a CDR 228, a serializer 230 operating in a similar way to that of the serializer 214 of the OLT 102, and a transmit clock 232. The transmit clock 232 operates at a clock rate compatible with the highest bit rate at which the ONU 104A transmits data, namely 622 Mbps. This clock rate may suitably be obtained from the CDR 228. The CDR 228 locks to the frequency of the incoming transmission from the OLT 102. This frequency can then be supplied to the serializer 230, which divides the frequency by a number necessary to obtain the proper frequency for the bit rate at which the ONU 104A is to transmit, and provides the result to the clock 232 as its transmission frequency. If the ONU 104A is to change transmission frequencies, the serializer 230 changes the division factor between transmissions to the factor required for the new transmission frequency, performs the division and supplies the new result to the clock 232.

The ONU 104A also includes a downsampling recovery module 234. The ONU 104A further includes a MAC/data processing and operation control circuit 236. In the case of the ONUs 104A ... 104N, the MAC/data processing and operation control circuit 236 does not manage scheduling for the network because that function is performed by the OLT 102, which schedules transmission for each of the ONUs 104A ... 104N in order to prevent collisions. The circuit 236 manages communication and control functions for the ONU 104A.

The downsampling recovery module 234 is illustrated here as a separate module implemented outside of the SERDES 218, but the downsampling recovery module 234 may alternatively be implemented in the CDR 228, or elsewhere in the SERDES 224 but not as part of the CDR 228.

The construction illustrated here allows the ONU 104A to receive and process data transmitted at one bit rate while maintaining proper operation when the OLT 102 is transmitting at other bit rates. The ONU 104A maintains a lock to the highest bit rate transmission performed by the OLT 102, namely 2488 Mbps.

In order to provide the capability to maintain a lock to transmissions received at 2488 Mbps, the SERDES 224 is preferably capable of maintaining a lock to the highest bit rate signal transmitted by the OLT 102. In the present case, this is a bit rate of 2488 Mbps. In order to allow the ONU 104A to receive and process signals transmitted at its own 622 Mbps bit rate, the downsampling recovery module 234 provides downsampling in order to achieve the broadband passive optical network bit rate of 622 Mbps, used by the ONU 104A.

Figure 2C:
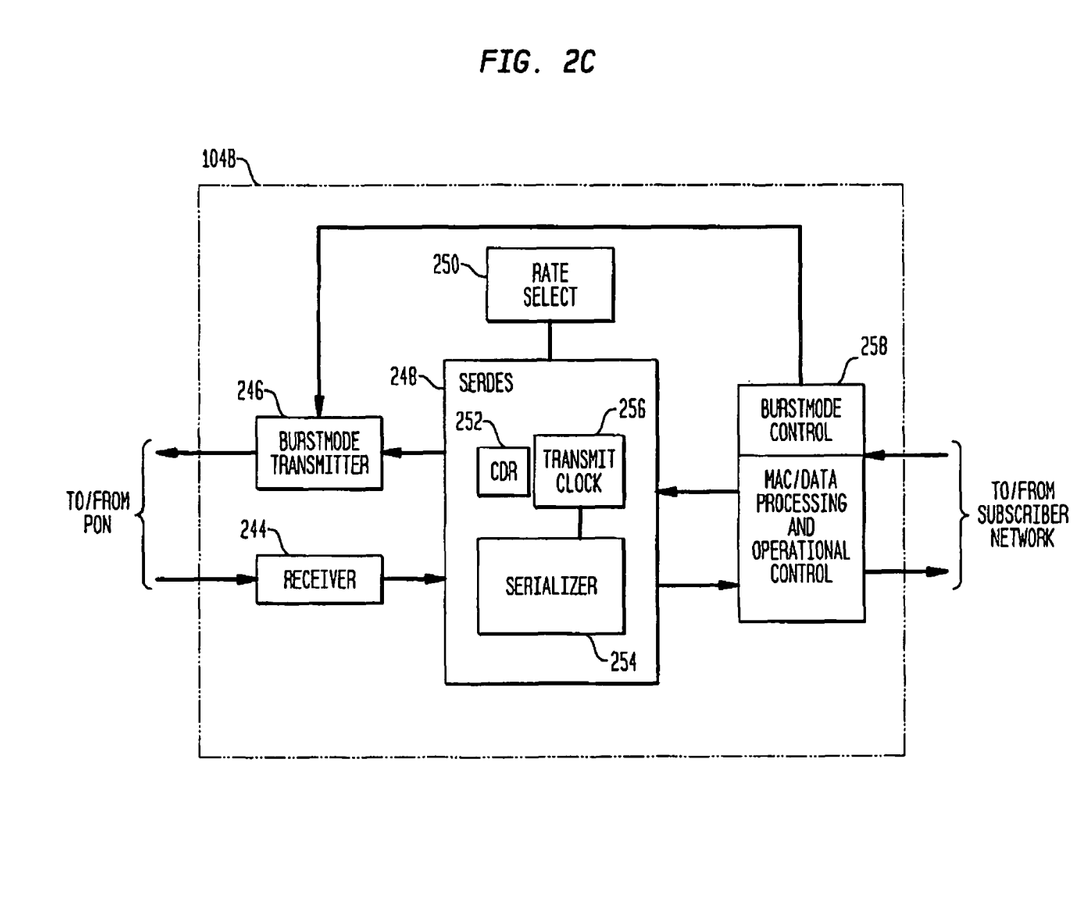

FIG. 2C illustrates additional details of the ONU 104B. The ONU 104B includes components similar to those of the ONU 104A, including a receiver 244, a burst mode transmitter 246, a serializer/deserializer (SERDES) 248, controlled by a rate select circuit 250 and including a CDR 252, as well as a serializer 254 employing a transmit clock 256. The ONU 104B also includes a MAC/data processing and operation control circuit 258. The ONU 104B does not include a downsampling module, because the bit rate at which the ONU 104B receives and processes data is 2488 Mbps, which is the highest bit rate at which the OLT 102 transmits data.

Figure 2D:
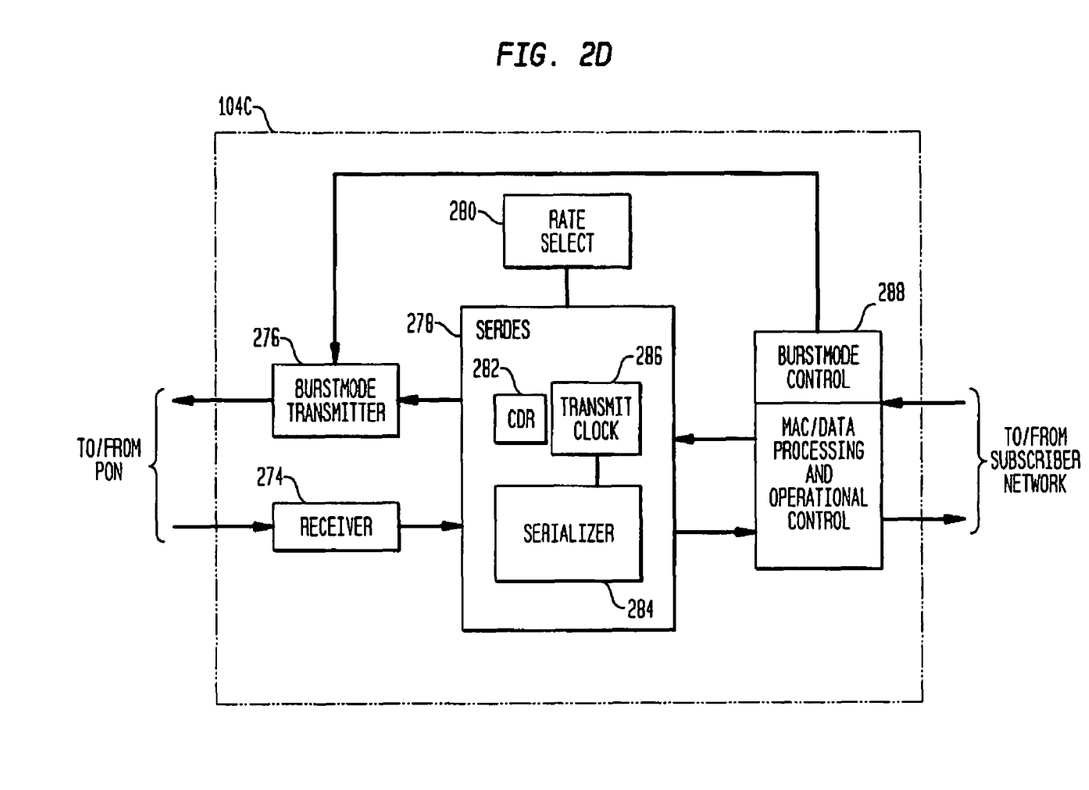

FIG. 2D illustrates additional details of the ONU 104C. The ONU 104C includes components similar to those of the ONU 104B, including a receiver 274, a burst mode transmitter 276, a serializer/deserializer (SERDES) 278, controlled by a rate select circuit 280 and including a CDR 282, a serializer 284 employing a transmit clock 286. The ONU 104C also includes a MAC/data processing and operation control circuit 288. The ONU 104C is capable of receiving and processing data at more than one bit rate, namely the bit rates 1244 Mbps and 2488 Mbps. Therefore, the CDR 282 includes components similar to those of the CDR 210 of FIG. 2A, for sensing the bit rate of an incoming signal and performing synchronization to the bit rate of the incoming signal. That is, the CDR 282 includes a bit rate detector, or alternatively transmissions may include protocol information used to identify the bit rate of incoming data.

Specific details and operational characteristics of the ONUs 104A-104C, and a specific combination of ONUs deployed together, are described here in order to provide a variety of exemplary configurations, but it will be recognized different configurations of ONUs and combinations of ONUs may be employed in the practice of the present invention.

FIG. 3A illustrates additional details of the clock and data recovery circuit 210 of FIG. 2A. The components of the clock and data recovery circuit 210 comprise a phase locked loop that locks to a phase and frequency of a received signal. The clock and data recovery circuit 210 includes a phase and frequency detector 302 and a summing circuit 304 to receive and sum phase up/down pulses and frequency up/down pulses. The clock and data recovery circuit also includes a low pass filter (LPF) circuit 306 and a voltage controlled oscillator (VCO) circuit 308. The VCO produces a recovered clock signal representing the bit rate of the input data stream. This recovered clock signal is supplied to the phase and frequency detector 302, which uses it to maintain a lock to the bit rate of the input data stream. The recovered clock signal is also supplied to a shift register 310, which uses the input data stream and the recovered clock signal to recover the data received from the input data stream.

In order to enable the clock and data recovery circuit to maintain synchronization in its operation and with the bit rate of the incoming data stream, the phase and frequency detector 302 employs a reference clock 312 and accompanying circuitry, such as a clock rate control circuit 314, in order to form a reference clock signal circuit 315. The reference clock 312 and the clock rate control circuit 314 are set to generate an appropriate effective reference clock rate in order to accommodate the bit rate exhibited by an incoming transmission. The effective reference clock rate is suitably equivalent to the bit rate being accommodated. For example, if the bit rate is 155 Mbps, the effective reference clock rate may be 155 MHz, if the bit rate is 622 Mbps, the effective reference clock rate may be 622 MHz, and so on.

In order to support multiple bit rate transmission and receiving, the CDR 210 is able to switch the effective reference clock rate that is used upon detection of the bit rate of the incoming data stream. Commonly available clocks that may be used as the reference clock 312 often do not rapidly switch clock rates, so the CDR 210 suitably employs the clock rate control circuit 314 to generate an effective reference clock signal to be supplied to the phase and frequency detector 302. The clock rate control circuit 314 may generate the effective reference clock signal by providing the output of the reference clock 312 to a multiplier/divider circuit 316 in order to generate one or more clock signal outputs. The clock signal outputs may be supplied to a selector 318, which selects the correct clock signal output for the detected bit rate. For example, the reference clock rate may produce an output signal of approximately 2488 MHz. The multiplier/divider circuit 318 may divide this signal by 1, 2, 4 and 16, to produce outputs of 2488 MHz, 1244 MHz, 622 MHz and 155 MHz. The selection circuit 320 selects an appropriate output for the detected bit rate, for example the 155 MHz output for a bit rate of 155 Mbps.

Detection may be accomplished by a dedicated bit rate detection circuit 320, or may be accomplished by prior knowledge of a bit rate of an incoming signal from a known source. The ONU from which an upstream transmission originates may be known and the bit rates at which each ONU is capable of transmitting may also be known, providing for appropriate selection or setting of the effective reference clock signal to accommodate a known bit rate. As a further alternative, identification of the bit rate of an incoming transmission may be achieved by transmission of a protocol message providing notification of a change in the bit rate, and the effective reference clock signal may be set accordingly.

Figure 3B:
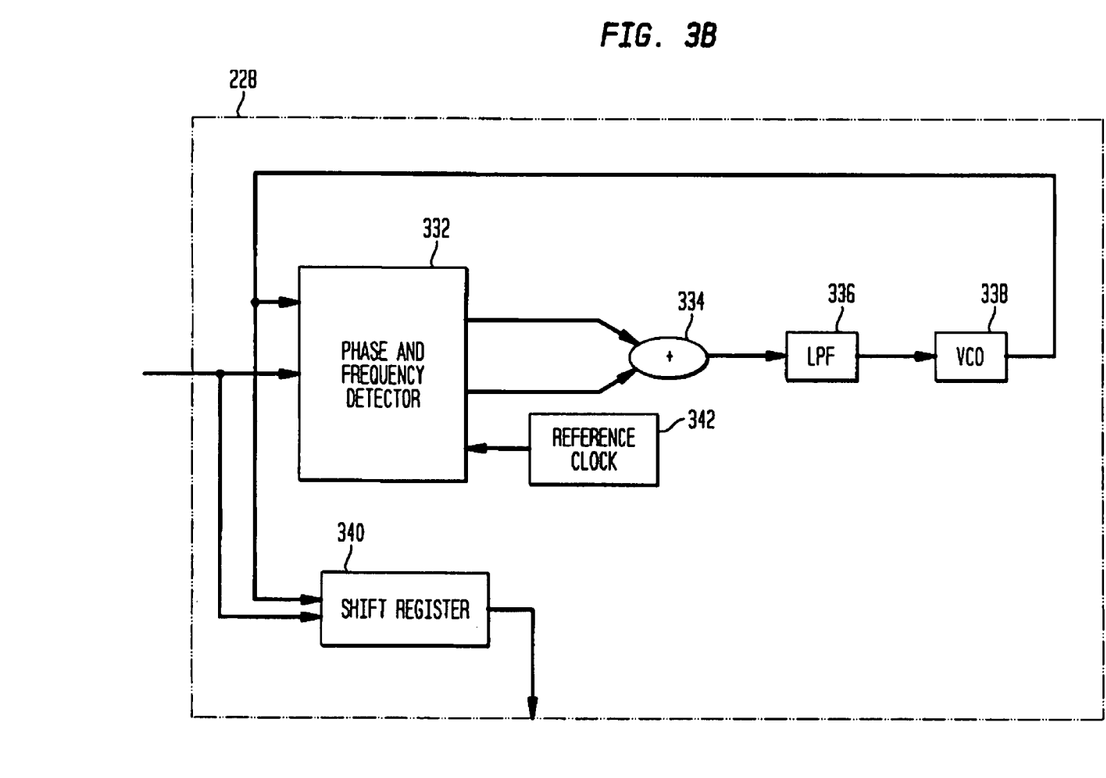
FIG. 3B illustrates a clock and data recovery circuit which may suitably be used in an optical network unit according to an aspect of the present invention.

FIG. 3B illustrates additional details of the clock and data recovery circuit 228 of FIG. 2B. The clock and data recovery circuit 228 comprises a phase locked loop that locks to a phase and frequency of a received signal and comprises components similar to those of the clock and data recovery circuit 210 of FIGS. 2A and 3A, including a phase and frequency detector 332, a summing circuit 334, a low pass filter (LPF) circuit 336, a voltage controlled oscillator (VCO) circuit 338, a shift register 340 and a reference clock 342. There is no need to switch the effective reference clock rate, so additional components used to allow for changing of the clock rate are not used. The reference clock 342 operates at a rate compatible with the highest bit rate used in the network 100, that is, the bit rate 2488 Mbps. The clock and data recovery circuit 220 will not lose phase and frequency lock when exposed to lower bit rates, and the output of the clock and data recovery circuit 228 will be delivered to the downsampling module 234, which will deliver data for processing when the downstream transmission exhibits the bit rate that is to be received and processed by the ONU 104A. The clock and data recovery circuit 228 need not provide burst mode capability, because all transmission rates achieved by the OLT 102 are based on the same transmit clock, that is, the transmit clock 232, and the OLT transmission maintains a continuous phase while switching between rates.

In order to avoid unnecessary duplication, additional details of the CDR 252 and the CDR 282 are not illustrated here, but the CDR 252 may suitably be similar to the CDR 228 of FIG. 2B because the ONU 104B does not receive and process downstream transmissions exhibiting more than one bit rate, namely, the bit rate of 2488 Mbps. Instead, the CDR 252 simply maintains a lock to transmissions at all incoming bit rates, but does not receive and process data exhibiting other bit rates. Similarly, the CDR 282 may suitably be similar to the CDR 210 of FIG. 2A, because the ONU 104C receives and processes data at more than one bit rate, so the CDR 282 changes its operation to accommodate data at different bit rates in a similar way to that of the CDR 210 of FIG. 2A.

The ability to adjust data transmission rates over a single network provides a number of advantages. One such advantage is the accommodation of bit rates to data traffic patterns. The speed of passive optical network service renders it a prime candidate for use in multimedia applications such as the delivery of high definition television (HDTV) content. Data traffic generated by most multimedia applications exhibits a bursty behavior. For example, most advanced video encoding algorithms produce traffic streams at significantly different rates at different times when significant changes, such as scene changes, occur. The ability of the network 100 to deliver different rates allows for an ONU, for example the ONU 104C, to be served at its peak rate during the times of its bursty data arrivals and at lower rates at all other intervals. This ability to change data transmission rates avoids serving an ONU at its maximum required rate when such service is not required. In addition, the ability to change data transmission rates allows for the implementation of scheduling so as to combine peaks and lulls in service requirements of different ONUs and thus provide for an efficient overall use of a network such as the network 100.

In addition, a network such as the network 100 is capable of adapting the bit rate of data transmission to meet quality of service (QoS) requirements. In rate adaptive service, a connection is established with a target QoS specification. In the case of the network 100, the OLT 102 would periodically adjust its transmission rate to meet a desired QoS requirement in light of the quality of the path available to the ONU. Detection of the quality of the path is typically accomplished by receiving an upstream transmission from an ONU to the OLT and comparing the rate at which the upstream transmission was received against a known transmission rate, or detecting errors through an error detection protocol or by comparing a received transmission against previously known content of the transmission.

Figure 4:
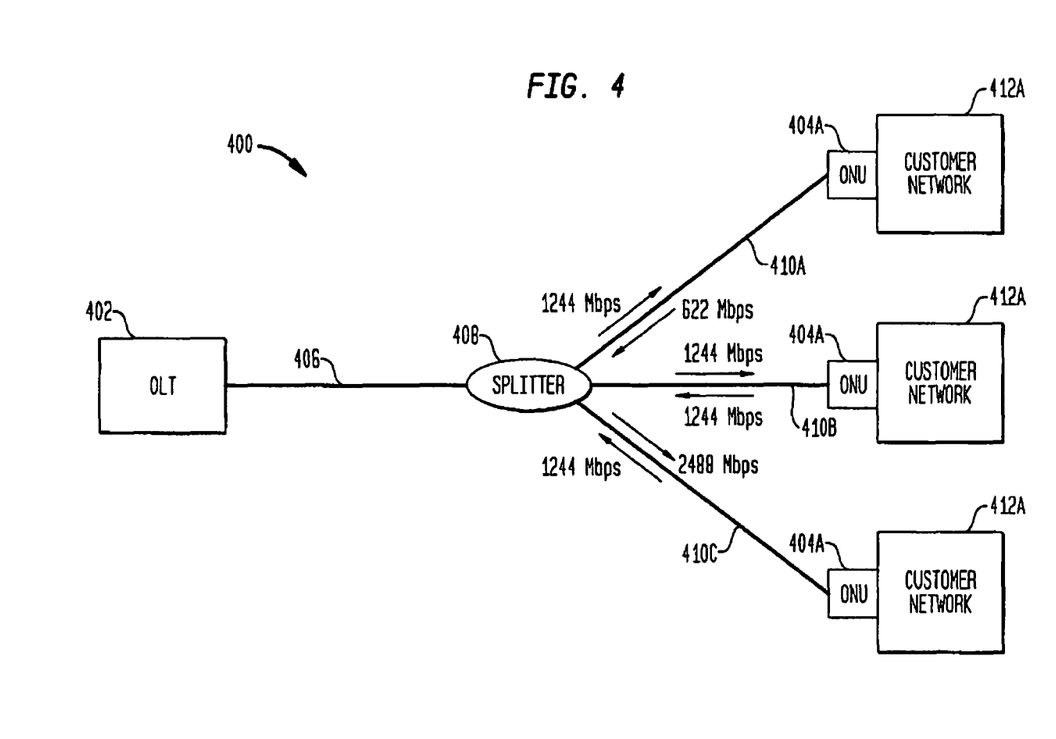
FIG. 4 illustrates a passive optical network providing different bit rates to different applications according to an aspect of the present invention.

One particularly notable efficiency provided by a passive optical network according to the present invention is the ability of a single OLT to serve multiple ONUs transmitting and receiving at different bit rates. FIG. 4 illustrates a passive optical network 400 supporting different bit rates for different subscribers. The network 400 comprises an OLT 402 connected to a plurality of ONUs 404A-404C by means of passive optical elements. The passive optical elements comprise a single mode fiber 406 leading from the OLT 402 to an optical splitter 408, and single mode fibers 410A-410C leading from the splitter 408 to the ONUs 404A-404C, respectively. The ONUs 404A-404C support customer networks 412A-412C, respectively.

A different level of service is provided to each customer, so the OLT 402 transmits at different bit rates and the ONUs 404A-404C transmit and receive at different bit rates. The OLT 402 is similar to the OLT 102 of FIG. 1, and the ONUs 404A-404C are generally similar to the ONUs 104A and 104B, in that each of the ONUs 404A-404C receives and processes data transmitted at only one bit rate, but each of the ONUs 404A-404C is capable of maintaining a phase and frequency lock when exposed to different bit rates. The OLT 402 transmits at 1244 Mbps and 2488 Mbps and receives at 622 Mbps, 1244 Mbps and 2488 Mbps. The ONU 404A transmits at 622 Mbps and receives at 1244 Mbps, the ONU 404B transmits at 1244 Mbps and receives at 1244 Mbps and the ONU 404C transmits at 1244 Mbps and receives at 2488 Mbps.

Depending on the requirements of the ONU being served, the OLT 402 transmits at one of its two bit rates. The ONUs 404A and 404B are able to maintain a lock during reception of data transmitted at 2488 Mbps, which is received and processed by the ONU 404C. This data is not received and processed by the ONUs 404A and 404B, but all data is transmitted to all ONUs, with each data packet bearing the address of its destination. An ONU will ignore data that is not transmitted at the bit rate at which it is operating, but each ONU is able to maintain a lock with the OLT 402 during transmission of such data. The ONUs 404A-404C can operate in a relatively simple fashion, with each ONU receiving at one bit rate and transmitting at one bit rate, but the multiple bit rate capability of the network 400 allows coexistence of multiple ONUs operating at different bit rates and provides the ability for a single OLT 402 to provide service at different rates to each of the ONUs 404A-404C.

Another particularly advantageous use of a multiple rate transmission in a passive optical network is to adapt operation of the network to accommodate the capabilities of components used in the network under different conditions that may prevail. One such adaptation is the adjustment of upstream transmission rates to avoid mode partition noise problems that would otherwise be presented by the use of lower cost lasers for the upstream transmission. ONUs will be relatively numerous in a passive optical network, so the use of low cost components in an ONU is highly advantageous. The use of lower cost lasers, preferably multilongitudinal lasers such as Fabry-Perot lasers, in an ONU, is highly desirable, and it is beneficial if high bit rates over long distances can be achieved using such lasers. Fabry-Perot lasers are typically rated for use at transmission rates of no more than 622 Mbps at distances over 20 km because of the possibility of mode partition noise. However, this limitation only prevails under relatively extreme conditions, and most of the time Fabry-Perot lasers can be used for upstream transmission at bit rates of 1244 Mbps and distances greater than 20 km. For example, at distances greater than 20 km, Fabry-Perot lasers can be reliably used for transmission at 1244 Mbps when their operating temperature is below 80° C., and can be used for transmission at 2488 Mbps when their operating temperature is below 40° C. A multiple bit rate system according to the present invention, which could achieve multiple upstream transmission rates, could employ Fabry-Perot lasers by monitoring the operating conditions such as operating temperature or error rate, and could achieve higher bit rate transmission when possible and lower bit rate transmission when required by prevailing conditions.

Figure 5:
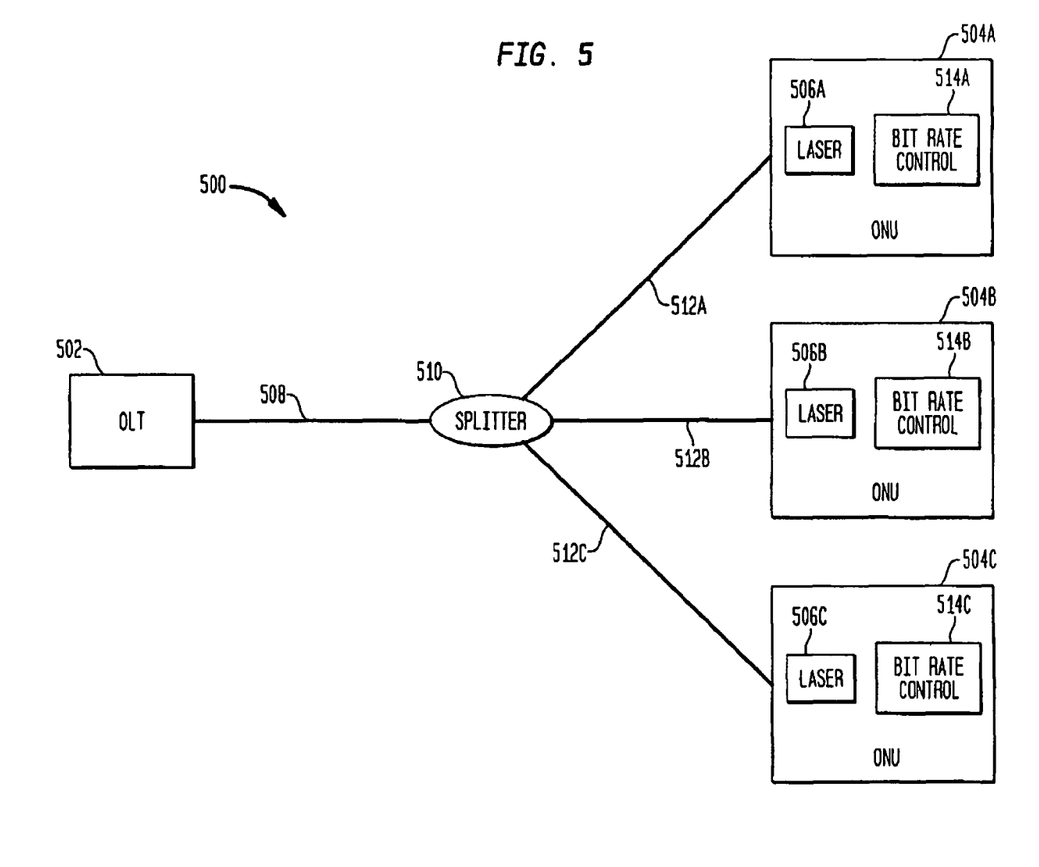
FIG. 5 illustrates a passive optical network which operates to adjust bit rate depending on transmission path quality, according to an aspect of the present invention.

FIG. 5 illustrates a network 500 using Fabry-Perot lasers for upstream transmission, with the operating conditions being monitored. The network 500 comprises an OLT 502 connected to a plurality of ONUs 504A-504C by means of passive optical elements. The ONUs 504A-504C employ Fabry-Perot lasers 506A-506C, respectively. The passive optical elements comprise a single mode fiber 508 leading from the OLT 502 to an optical splitter 510, and single mode fibers 512A-512C leading from the splitter 510 to the ONUs 504A-504C, respectively. The ONU 504A transmits at 155, 622 or 1244 Mbps and receives at 1244 Mbps, the ONU 504B transmits at 622 or 1244 Mbps and receives at 1244 Mbps and the ONU 504C transmits at 622, 1244 or 2488 Mbps and receives at 2488 Mbps. Each of the ONUs 504A-504C includes a bit rate control module 514A-514C, respectively, for sensing operating conditions and selecting a bit rate that can be accommodated by the operating conditions at which the laser employed by the ONU is operating. For example, the bit rate control modules 514A-514C may receive laser temperature information or may receive error information returned by the OLT 502. The OLT 502 is similar to the OLT 102 and is capable of receiving data at multiple bit rates, and the ONUs 504A-504C are suitably similar to the ONUs 104A and 104B, in that they are capable of transmitting at different bit rates, receiving at a single bit rate and maintaining proper operation when the OLT 502 transmits at multiple bit rates.

Figure 6A:
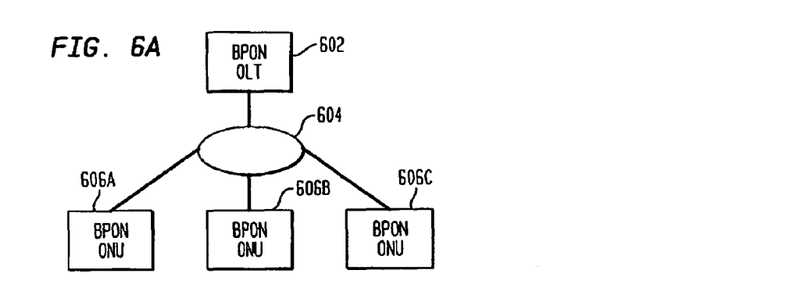
FIGS. 6A-6C illustrate stages in an upgrade of a broadband passive optical network to a dual gigabit passive optical network-broadband passive optical network according to an aspect of the present invention.
Figure 6B:
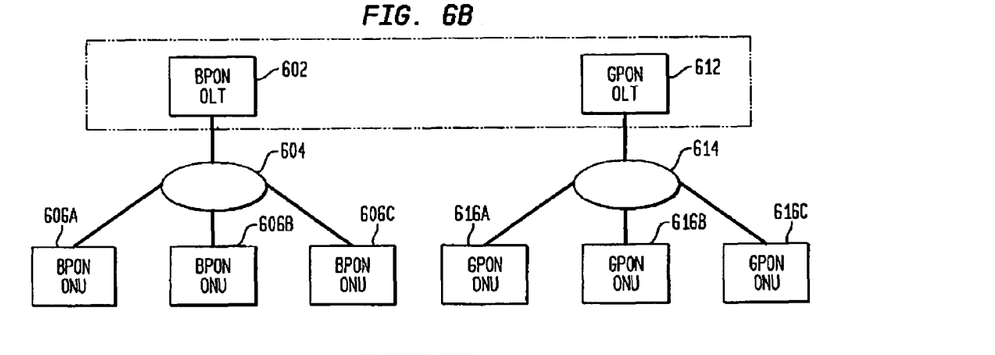
Figure 6C:
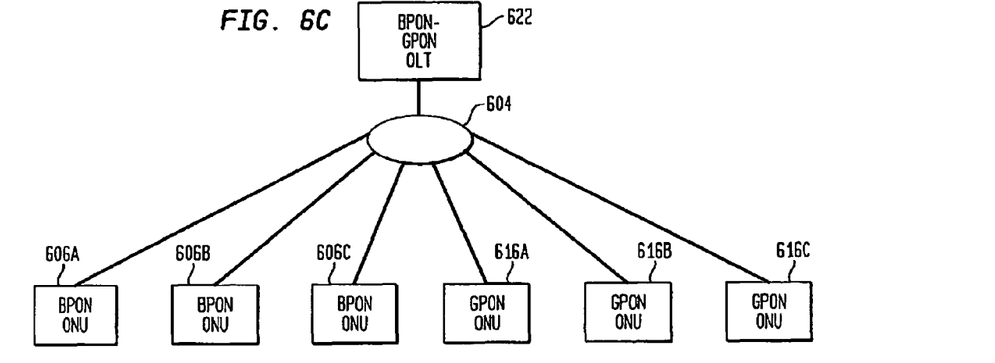

Multiple bit rate capability in a passive optical network is also useful for making a cost efficient upgrade and transition between standards, for example upgrading a BPON network to a network supporting both BPON and GPON. FIG. 6A illustrates a network supporting BPON communication, and FIGS. 6B and 6C represent alternative upgrades of the network from the BPON network to a network supporting both BPON and GPON. FIG. 6A illustrates a BPON network 600, with a multiple bit rate capable BPON OLT 602, a splitter 604 and a plurality of multiple bit rate capable BPON ONUs 606A-606C, capable of maintaining a lock when exposed to GPON standard transmissions. The network 600 accommodates bit rates from 1244 Mbps downstream and 622 Mbps upstream to 155 Mbps upstream and downstream.

FIG. 6B illustrates the network 600 with the OLT 602, the splitter 604 and the ONUs 606A-606C. The network 600 has been upgraded to add a GPON OLT 612, connected using a splitter 614 to a plurality of GPON capable ONUs 616A-616C. The OLT 612 and the ONUs 616A-616C accommodate bit rates from 2488 Mbps downstream and 1244 Mbps upstream to 1244 Mbps downstream and 155 Mbps upstream.

FIG. 6C illustrates the network 600 with the OLTs 602 and 612 replaced by a multiple standard OLT 622. The splitter 604 and the ONUs 606A-606C and the ONUs 616A-616C remain. Because only one OLT 622 is required, only one splitter 604 is needed. The multiple bit rate capabilities of the ONUs and the OLTs allow for a smooth upgrade and transition as new components are added that can maintain compatibility with the presently existing components.

Figure 7:
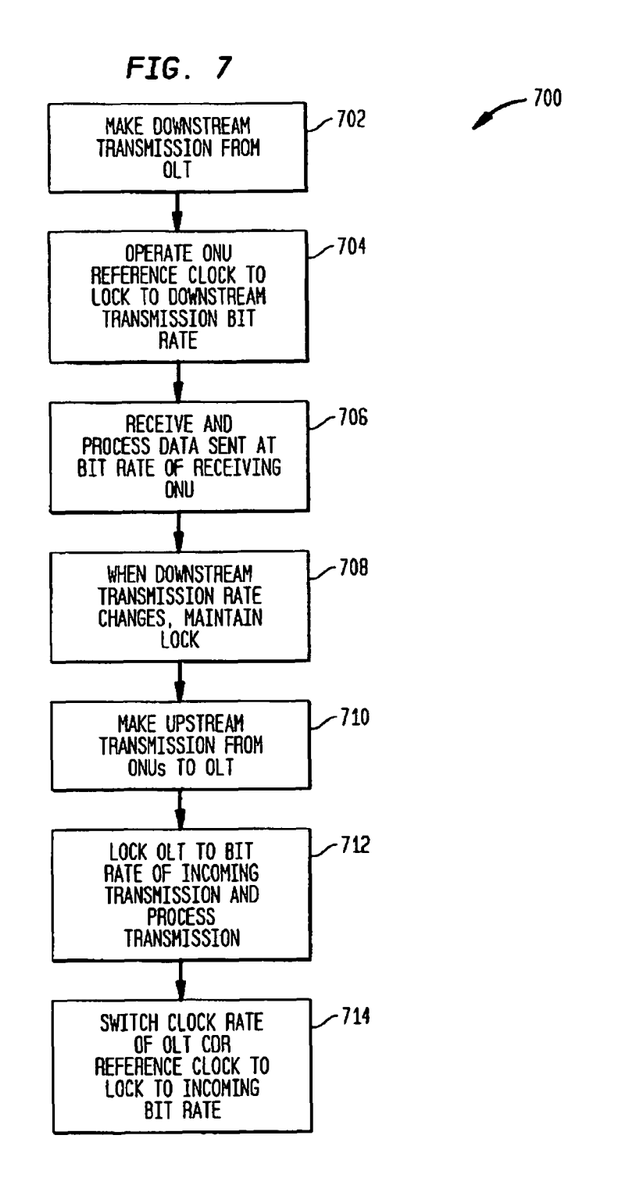
FIG. 7 illustrates a process of optical data transmission according to an aspect of the present invention.

FIG. 7 illustrates the steps of a process 700 of communication over a multiple bit rate passive optical network according to an aspect of the present invention. The process 700 may suitably be performed by a system similar to the system 100 of FIG. 1, having components similar to those illustrated in FIGS. 2A-2D, 3A and 3B. At step 702, a downstream transmission is made from an optical line termination unit (OLT) to a plurality of optical network units (ONUs). Each of the ONUs is capable of receiving at one or more bit rates, and the OLT and ONUs are constructed and operated such that the highest bit rate transmitted by the OLT is an integer multiple of each bit rate that can be received by any ONU. At step 704, when a downstream transmission is received by an ONU, a reference clock implemented by a clock and data recovery circuit employed by the ONU operates at a clock rate allowing the ONU to lock to the bit rate of the transmission. At step 706, each ONU receives and processes data that is transmitted at the bit rate at which it is set to receive. The ONU ignores data that is not transmitted at its own bit rate, but continues to maintain a lock to the bit rate of the downstream transmission. At step 708, the downstream bit rate changes, for example in response to changing conditions or to changing needs, such as changes in the bit rate required to support applications being performed by an ONU. Each ONU continues to maintain a lock to the bit rate of the downstream transmission.

At step 710, the ONUs perform upstream transmissions to the OLT. At step 712, when an upstream transmission is received by the OLT, the OLT locks to the bit rate of the transmission and processes the transmission. At step 714, when the bit rate of the transmission received by the OLT changes, an effective reference clock rate used by a clock and data recovery circuit employed by the OLT is changed in order to maintain a lock with the bit rate of the incoming transmission.

While the present invention is disclosed in the context several embodiments, it will be recognized that a wide variety of implementations may be employed by persons of ordinary skill in the art consistent with the above discussion and the claims which follow below.

We claim:

1. An optical network unit (ONU) for use in a passive optical network employing multiple downstream bit rates, comprising:
    a media access control and data processing and operational control circuit;
    a serializer/deserializer operating at a clock rate compatible with a highest bit rate used in the passive optical network and producing deserialized output and comprising a clock data recovery circuit employing a bit rate detection circuit to detect bit rates of downstream transmissions based on sensing phase and frequency of the downstream transmissions, the clock data recovery circuit utilizing the detected bit rates to synchronize the serializer/deserializer with downstream transmissions having different bit rates; and
    a downsampling module for translating the output of the serializer/deserializer to a lower bit rate data stream and providing the lower bit rate data stream to the media access control and data processing and operational control circuit.

2. The optical network unit of claim 1, wherein the ONU operates under dual gigabit passive optical network (GPON) standards and broadband passive optical network BPON) standards, wherein the serializer/deserializer operates at a clock rate compatible with a GPON standard bit rate and wherein the downsampling module translates the output of the serializer/deserializer to a BPON standard bit rate data stream.

3. The optical network unit of claim 1, wherein the ONU transmits upstream data at two or more upstream transmission rates and the upstream transmission rate is selectively changed to accommodate a transmission path quality of an available transmission path.

4. The network of claim 1, wherein the ONU is operative to receive and process downstream data transmissions at more than one bit rate, transmission path quality is indicated by an upstream transmission from the ONU, and the ONU adapts for changes in a downstream transmission rate to the ONU to accommodate the quality of the transmission path.

5. The optical network unit of claim 1, further comprising:
    a multilongitudinal laser for data transmission and said media access and data processing and operational control circuit changes the bit rate employed for upstream data transmission depending on the capabilities of the laser used under conditions prevailing at the time of transmission.

6. The optical network unit of claim 1 further comprising:
    a clock and data recovery circuit operative to achieve a phase and frequency lock to a highest bit rate downstream transmission.

7. The optical network unit of claim 6 wherein the clock and data recovery circuit is operative to maintain the phase and frequency lock when the bit rate of downstream transmission changes.

* * * * *